United States Patent [19]

Greene

[11] Patent Number: 4,832,974
[45] Date of Patent: May 23, 1989

[54] NUTMEG EMULSION AND PROCESS FOR MAKING SAME

[75] Inventor: Leonard M. Greene, Scarsdale, N.Y.

[73] Assignee: Cream of Nutmeg Corporation, White Plains, N.Y.

[21] Appl. No.: 60,457

[22] Filed: Jun. 11, 1987

[51] Int. Cl.⁴ .......................... A23L 1/22; A23L 1/221
[52] U.S. Cl. .................................... 426/651; 426/430; 426/650
[58] Field of Search ............................... 426/651, 430

[56] References Cited

U.S. PATENT DOCUMENTS 4,158,708 6/1979 Chiovini et al. .................... 426/430

FOREIGN PATENT DOCUMENTS 522187 2/1956 Canada ................................ 426/651

OTHER PUBLICATIONS

Pruthi, Spices and Condiments: Chemistry, Microbiology, and Technology, 1980, Academic Press, N.Y., pp. 243-244.

Fenaroli's Handbook of Flavor Ingredients, 2nd ed., 1975, CRC Press, Cleveland Ohio, vol. 1, pp. 246-247, and 413-414.

Primary Examiner—Donald E. Czaja
Assistant Examiner—Helen Pratt
Attorney, Agent, or Firm—Kirschstein, Kirschstein, Ottinger & Israel

[57] ABSTRACT

A nutmeg emulsion is made by dissolving powdered nutmeg kernels in a solvent, e.g. alcohol, to extract nutmeg flavor fats and oils therefrom. The extracted flavor fats and oils are diluted with water to form the emulsion. All steps in the process of making the emulsion are performed at room temperature to avoid loss of nutmeg aroma and spicy flavor.

9 Claims, 1 Drawing Sheet

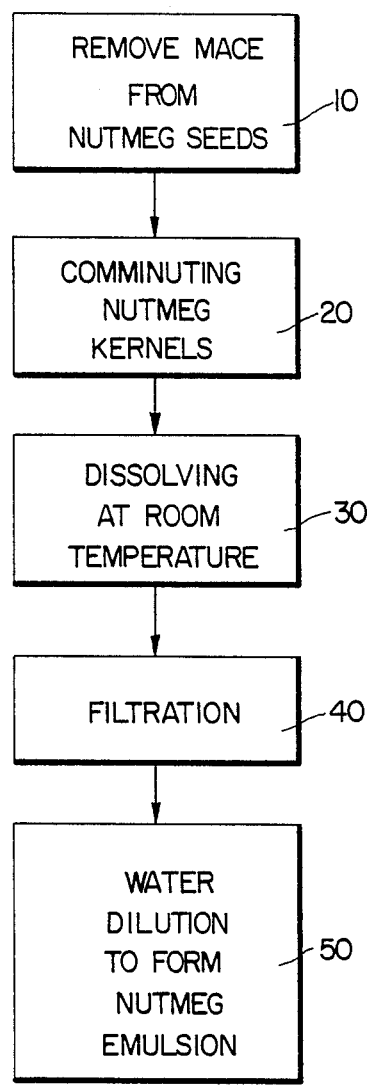

NUTMEG EMULSION AND PROCESS FOR MAKING SAME

BACKGROUND OF THE INVENTION

1. Field of the Invention

This invention generally relates to nutmeg and, more particularly, to a process of and an arrangement for making a nutmeg emulsion, as well as the nutmeg emulsion itself.

2. Description of Related Art

Nutmeg is a delicately flavored spice derived from the hard, aromatic kernel of the seed of an East Indian tree. The hard kernel may be grated and sprinkled over various foods for use as a flavor additive.

It is also known to manufacture nutmeg oil by heating nutmeg kernels at elevated temperatures. Nutmeg oil is also known as myristica oil, and is a pale yellow or substantially colorless essential oil. Nutmeg oil is used as a flavor additive for foods, and can also be used in perfumes and medicines.

However, during the manufacturing process of nutmeg oil, the heating of the kernels tends to drive off volatiles as well as at least some of the flavor fats and oils from the kernels. The heating process thus tends to compromise nutmeg aroma and degrade the spicy flavor, resulting in a less than full-bodied nutmeg aroma and spicy flavor.

SUMMARY OF THE INVENTION

1. Objects of the Invention

It is a general object of this invention to overcome the aforementioned drawbacks associated with nutmeg.

It is another object of this invention to provide a nutmeg emulsion having a full-bodied nutmeg aroma and spicy flavor which can be used for many purposes, such as a flavor additive for foods and drinks, or in perfumes or medicines.

Yet another object of this invention is to provide a novel process of and arrangement for making a nutmeg emulsion at room temperature without compromising the nutmeg aroma and flavor.

2. Features of the Invention

In keeping with these objects, and others which will become apparent hereinafter, one feature of this invention resides, briefly stated, in a process of and an arrangement for making a nutmeg emulsion at room temperature.

First, the outer coating, i.e. mace, from each nutmeg seed is removed, preferably by mechanical stripping, to thereby obtain the nutmeg kernel from within each seed.

Next, the nutmeg kernels are comminuted into particulate form, preferably by being mechanically crushed or ground. The final particle size can range from broken fragments to a fine nutmeg powder.

Thereupon, a solvent, e.g. industrial strength alcohol, is added to the particulate nutmeg kernels at room temperature. The solvent acts to extract flavor fats and oils from the particulate kernels. A solution is thereby formed which includes nutmeg solids and nutmeg liquids. The alcohol, which is preferably of the food grade type, is approximately 95% ethyl alcohol, and causes the rapid dissolving of the particulate kernels.

The nutmeg solids are removed from the solution by filtration to obtain the nutmeg liquids which, of course, include the extracted flavor fats and oils. Gravity filtering is satisfactory and, in a preferred embodiment, the solution can be passed through filter paper of the type frequently used in coffee filters.

A nutmeg emulsion is thereupon formed by diluting the nutmeg liquids with water at room temperature. The extracted flavor fats and oils are suspended in the water. Substantially equal parts of water and nutmeg liquids form the emulsion. The flavor fats and oils are very insoluble in water.

The resulting nutmeg emulsion has a light creamy consistency and has a creamy tannish color. Since heat has not been used in the manufacture of the nutmeg emulsion, the full-bodied nutmeg aroma and spicy flavor are retained. Since the nutmeg emulsion is a liquid suspension, it may be very conveniently added to drinks to serve as a flavor additive.

The novel features which are considered as characteristic of the invention are set forth in particular in the appended claims. The invention itself, however, both as to its process and arrangement for making the emulsion, together with additional objects and advantages thereof, best will be understood from the following description of the specific embodiment when read in connection with the accompanying drawing.

BRIEF DESCRIPTION OF THE DRAWING

The single FIGURE is a block diagram of the process of and arrangement for making a nutmeg emulsion in accordance with this invention.

DETAILED DESCRIPTION OF THE PREFERRED EMBODIMENT

Referring now to the single FIGURE, a process of making a nutmeg emulsion is schematically shown by way of a block diagram, each block representing a different step in the process. The first step, denoted by reference numeral 10, involves removing the outer coating, e.g. mace, from each nutmeg seed, thereby obtaining a nutmeg kernel located within each seed. Step 10 is performed preferably by mechanically stripping the mace from each seed.

The next step 20 involves comminuting the nutmeg kernels into particulate form. The kernels may be mechanically crushed or ground by a wide variety of means. The final particulate size can range from a few broken fragments or pieces of relatively large size, e.g. roughly ¼" in diameter, to a fine powder, e.g. usually smaller than 1000 micrometers.

The next step 30 in the process involves dissolving the particulate kernels in a solvent, e.g. industrial strength alcohol, at room temperature to thereby form a solution. The solution includes nutmeg solids as well as nutmeg liquids which contain extracted flavor fats and oils from the particulate kernels. When the emulsion is to be used for foods and drinks, the alcohol is 95% ethyl alcohol and of the food grade type. The alcohol very rapidly dissolves the particulate kernels at room temperature. In a preferred example, approximately twenty average size nutmeg kernels are dissolved by one ounce of alcohol to form a saturated solution.

The next step 40 involves removing the nutmeg solids from the solution to obtain the nutmeg liquids. This removing step involves filtration, and can be performed by passing the solution through filter paper in a gravity feed system. The filter paper can be designed with many different pore sizes and, in a preferred example, conventional coffee filter paper can be used.

The last step 50 involves diluting the nutmeg liquids with water at room temperature to form a nutmeg emulsion. Equal parts of water and nutmeg liquids will form the emulsion. The flavor fats and oils which form part of the nutmeg liquids are very insoluble in the water and are suspended therein. The water is preferably deionized and/or distilled.

The resultant nutmeg emulsion has a light creamy consistency and a creamy tannish color. Since all of the aforementioned steps are performed at room temperature, volatiles are not driven off together with the flavor. Hence, the full-bodied nutmeg aroma and spicy flavor are retained. The nutmeg emulsion can be added to foods as well as to drinks and serves as a flavor additive. The nutmeg emulsion can also be added to perfumes and medicines. Due to the insolubility of the flavor fats and oils in the water, it may be necessary to shake the emulsion prior to use.

While the invention has been illustrated and described as embodied in a nutmeg emulsion and process of and arrangement for making same, it is not intended to be limited to the details shown, since various modifications may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process of making a food-grade, nutmeg emulsion, comprising the steps of:
   (a) obtaining nutmeg kernels from nutmeg seeds by removing outer coatings from the nutmeg seeds;
   (b) forming the nutmeg kernels into particulate form;
   (c) extracting flavor fats and oils from the particulate kernels by dissolving the particulate kernels in a liquid solvent at room temperature to form a solution including nutmeg solids, the liquid solvent and nutmeg liquids having the extracted flavor fats and oils;
   (d) removing the nutmeg solids from the solution to obtain the nutmeg liquids and the liquid solvent; and
   (e) diluting the nutmeg liquids and the liquid solvent with water at room temperature to form the food-grade, nutmeg emulsion.

2. The process as recited in claim 1, wherein the step (a) is performed by mechanically stripping the outer coatings from the seeds.

3. The process as recited in claim 1, wherein the step (b) is performed by comminuting the kernels.

4. The process as recited in claim 1, wherein the step (c) is performed by adding industrial strength alcohol to the particulate kernels.

5. The process as recited in claim 1, wherein the step (d) is performed by filtering the solution by passing the solution through a filter.

6. The process as recited in claim 1, wherein the step (e) is performed by adding substantially equal parts of water to substantially equal parts of nutmeg liquids and liquid solvent.

7. The process as recited in claim 1, wherein all the steps are performed at room temperature.

8. A food-grade, nutmeg emulsion comprising: a liquid solvent, flavor fats and oils obtained from comminuted nutmeg kernels dissolved in the solvent, and water mixed in substantially equal parts by volume with the solvent and the flavor fats and oils to form a food-grade, suspension.

9. A food-grade, nutmeg emulsion made by a process having the following steps performed at room temperature:
   (a) removing outer coatings of nutmeg seeds to obtain nutmeg kernels;
   (b) comminuting the kernels to particulate form;
   (c) dissolving the particulate kernels in a liquid solvent to form a solution of nutmeg solids, the liquid solvent and nutmeg liquids in which nutmeg flavor fats and oils are extracted from the particulate kernels;
   (d) separating the nutmeg liquids and the liquid solvent from the nutmeg solids; and
   (e) adding water to the nutmeg liquids and the liquid solvent to form the food-grade, nutmeg emulsion.

* * * * *